United States Patent [19]

Mayo Magdaleno

[11] 4,365,179
[45] Dec. 21, 1982

[54] PULSE MOTOR

[75] Inventor: Casimiro Mayo Magdaleno, Toledo, Spain

[73] Assignees: Federico Marne Blanco, Valladolid; Gonzalo de Onate Fernandez de Gamboa, Madrid, both of Spain; part interest to each

[21] Appl. No.: 313,627

[22] Filed: Oct. 21, 1981

[30] Foreign Application Priority Data

Oct. 21, 1980 [ES] Spain .................................. 496.129

[51] Int. Cl.³ .............................................. H02K 7/00
[52] U.S. Cl. ........................................ 310/81; 310/82; 310/75 D
[58] Field of Search .................. 310/7 RR, 75 D, 81, 310/82

[56] References Cited

U.S. PATENT DOCUMENTS

| | | | |
|---|---|---|---|
| 2,703,370 | 3/1955 | Steensen | 310/82 |
| 2,854,188 | 9/1958 | Shomphe | 310/81 X |
| 2,857,536 | 10/1958 | Light | 310/82 |
| 2,969,472 | 1/1961 | Faller | 310/82 |
| 3,117,244 | 1/1964 | Rosain et al. | 310/82 |
| 3,396,294 | 8/1968 | Makino | 310/81 |
| 3,411,026 | 11/1968 | Rosain et al. | 310/82 |
| 3,560,774 | 2/1971 | Reeves | 310/75 X |

*Primary Examiner*—Donovan F. Duggan
*Attorney, Agent, or Firm*—Fleit & Jacobson

[57] ABSTRACT

An electrically operated pulse motor having a stator and a rotor mounted within a chassis, the ends of the shaft of the rotor having been mounted in a pair of sleeves joined to the chassis, the inner diameter of the sleeves being larger than the diameter of the ends of the rotor shaft. The ends are connected with a pair of projecting semi-axles (axle shafts) of the rotor that are eccentric in relation to the shaft of the rotor and of a larger size than the aforementioned difference between the diameter of the rotor shaft and the inner diameter of the sleeve, the eccentricity between the projecting semi-axles and the rotor shaft being absorbed by means of the interposition of elastic couplings that change their shape during the operation of the motor.

2 Claims, 4 Drawing Figures

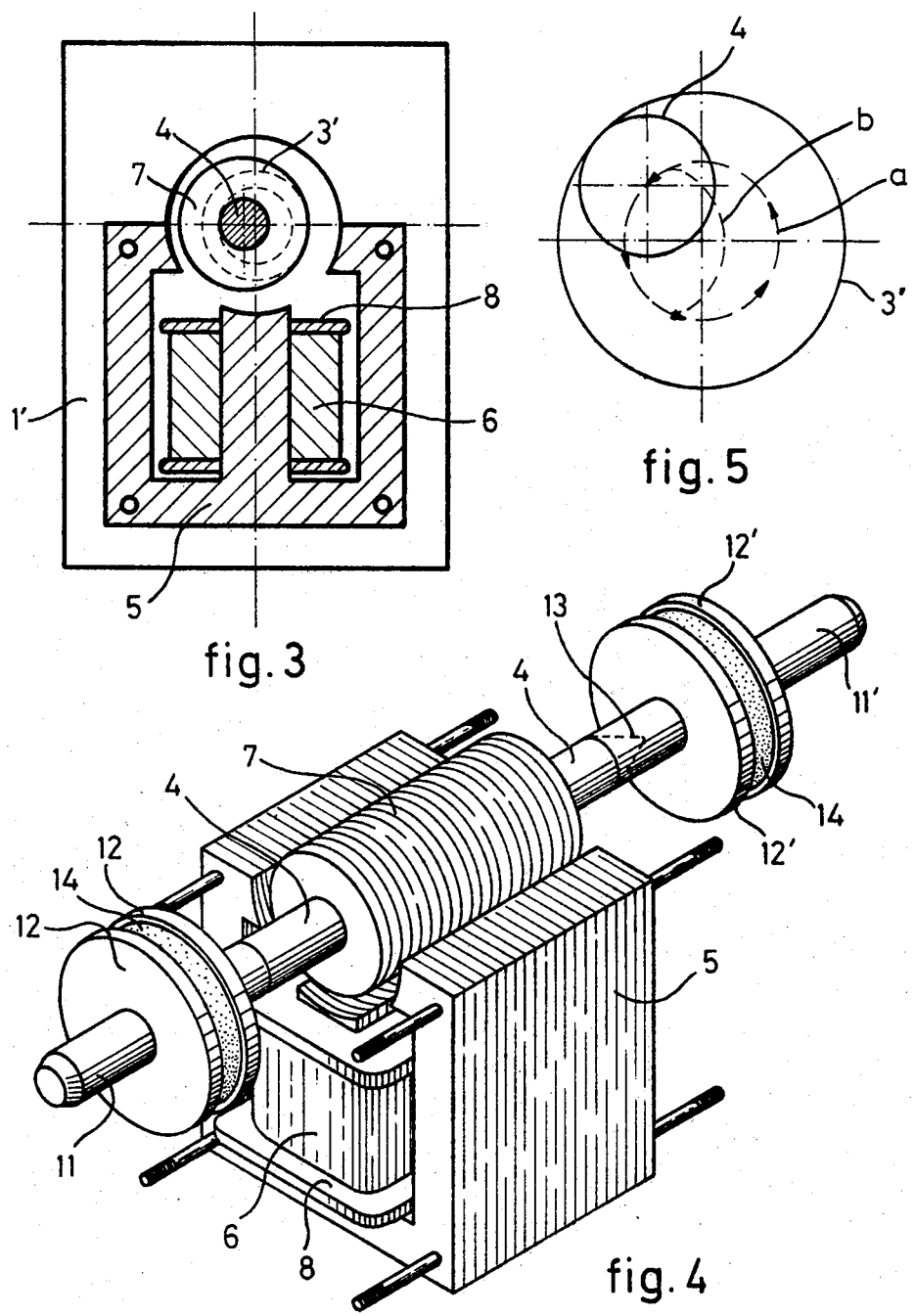

PULSE MOTOR

BACKGROUND OF THE INVENTION

The present invention is concerned with an electric motor which is called a "pulse motor", and which is capable of transforming the pulses of magnetic attraction into a rotating motion that is suitable for performing work with a remarkable energy efficiency.

This motor may be used in the field of motors requiring a high starting torque, but would also be perfectly adaptable to any other mechanical application.

Likewise, it is fully adaptable to those needs requiring a frequent change of the speed of rotation, without any appreciable variation of the torque, and to other applications in which there is a high contamination index, in view of the tightness of its assembly.

SUMMARY OF THE INVENTION

The electric motor of the present invention has a stator and a rotor which are mounted within a chassis, the ends of the shaft of the rotor having been mounted in a pair of sleeves joined to the chassis, the inner diameter of the sleeves being larger than the diameter of the ends of the rotor shaft. The ends are connected with a pair of projecting semi-axles (axle shafts) of the rotor that are eccentric in relation to the shaft of the rotor and of a larger size than the aforementioned difference between the diameter of the rotor shaft and the inner diameter of the sleeve, the eccentricity between the projecting semi-axles and the rotor shaft being absorbed by means of the interposition of elastic couplings that change their shape during the operation of the motor. When the power of the motor is supplied by electricity, viz. by alternating current, the aforementioned couplings move the rotor in a direction that is opposite to the attraction by the stator, and the rotor describes a circular motion, with its shaft being in constant contact with the inner surfaces of the sleeves, and a rotating movement around its own shaft that is translated into a circular movement of the projecting semi-axle.

A search of the prior art, i.e. for electric motors that make use of angular or circular movements of a rotor and of means of an elastic response for obtaining conventional circular movement, has had a negative result.

BRIEF DESCRIPTION OF THE DRAWINGS

The pulse motor of the present invention is more easily understood, and the other characteristics and advantages of said motor, are more fully apparent from the following detailed description of a preferred embodiment of the invention (without limiting the invention thereto) and by reference to the accompanying drawings in which:

FIGS. 2 and 3 are sectional views of the motor of FIG. 1 along the lines II—II and III—III, respectively;

FIG. 4 is a perspective view of the motor without the chassis or other auxiliary members; and FIG. 5 is a schematic drawing of the relative positions of the shaft of the rotor in a sleeve, at rest, and also shows two illustrations—in dotted lines—of the possible trajectories of the center of the shaft of the rotor during its movement of translation through the inside of the sleeves.

DETAILED DESCRIPTION OF THE PREFERRED EMBODIMENTS

Figure 1:
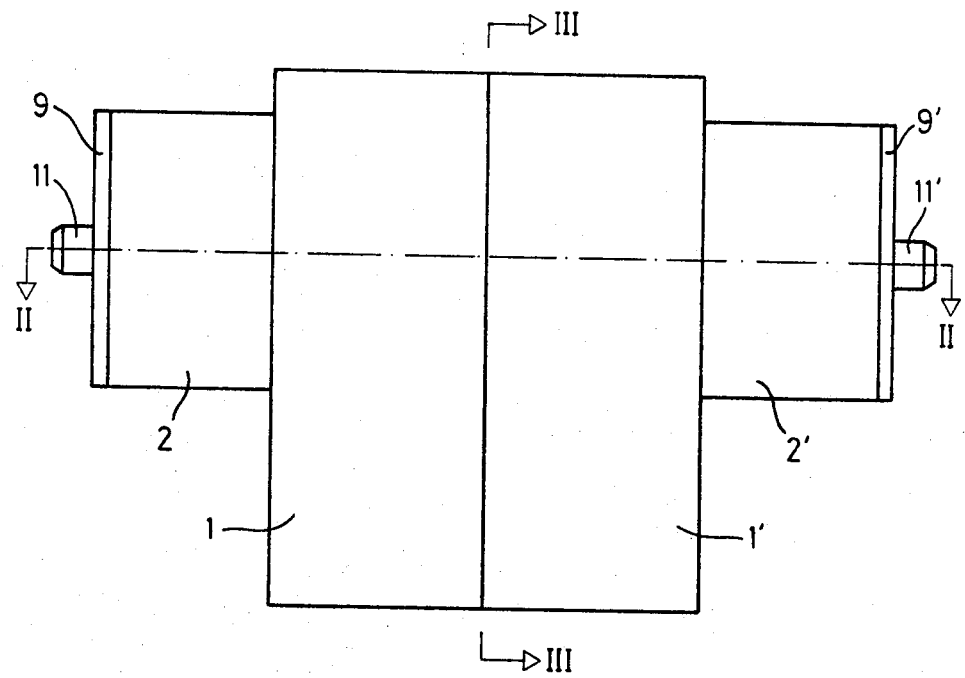
FIG. 1 is a lateral view of the motor that is the object of the invention.

The motor consists of a support or chassis which, as shown in FIG. 1, has a largely parallelepipedic form, but which may assume any other shape, and which is divided into two symmetrical halves or semichassis which have been designated by reference 1 and 1'. These halves are shaped as follows. Their lateral surface, which is the larger one, as shown in FIG. 1 has a cylindrical cavity in which there have been pressure fitted, with the aid of threads or screws, cylindrical frames 2 and 2' which enclose the converting mechanisms of movement based on the elastic couplings.

Figure 2:
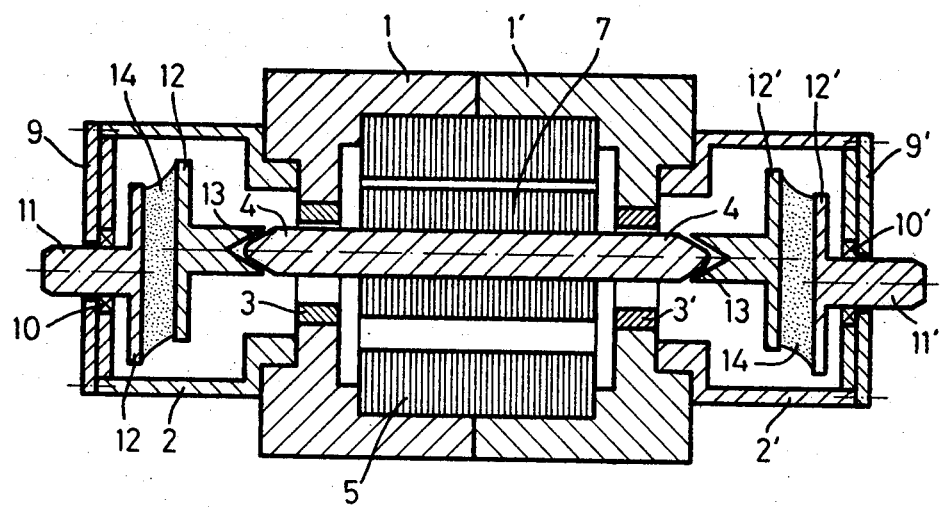

As shown in FIG. 2, the circular bottom of said cavities of the semi-chassis 1 and 1' each have a center opening to their interior where metal sleeves 3 and 3' which have a cylindrical shape, are mounted under pressure. The ends of shaft 4 of the rotor of the motor pass through their interior, said shaft having a smaller diameter than the inside of the sleeves 3 and 3'; the difference of diameters between the sleeves 3 and 3' and the shaft of the rotor 4 creates a certain play that is necessary for the operation of the motor.

Each semi-chassis 1 and 1' presents, on the surface opposite the one described above, a recess of a form that is convenient for fitting into it one half of the magnetic core 5, of the coil 6, and of the rotor 7 with its shaft 4. By said halves is meant either one of the parts that result from cutting the motor along a plane through the axis of longitudinal symmetry of the rotor 7.

The magnetic core 5 of the motor consists of a stack of magnetic plates of appropriate quality, arranged in three columns, and around the central column of which the winding of the coil 6 has been placed; all of that constitutes the stator. At its upper part, the ends of the columns are cut off in a circular fashion for the purposes of receiving the rotor 7, the stacking of magnetic plates being such that only the lower half of said rotor 7 will be surrounded (without the existence of any contact) by the magnetic core 5.

Coil 6 of the stator consists of a roll of copper wire or wire of any other material that conducts electricity in a suitable manner, with appropriate section and isolation, on a spool 8 that is suitable for the purpose and—as has been mentioned before—is inserted around the central column of the magnetic core 5. The rotor 7 consists of a cylindrical piece of ferro-magnetic material, e.g. of a stack of plates, and has a diameter and length that are proper for its function; said piece is mounted on shaft 4, the ends of which terminate in cones projecting toward the outside. The rotor 7 and its shaft 4 form one unit, the rotor 7 being located between the semi-chassis 1 and 1' and the magnetic core 5, while the ends of the shaft 4 lie across said semi-chassis 1 passing through the inside of the sleeves 3 and 3', the inner diameter of which is larger than that of the shaft 4. The separation that exists between the outer surfaces of the rotor 7 and the columns of the magnetic core 5 is larger than the play or difference of diameters that exists between the shaft 4 and the inside of the sleeves 3 and 3', in order that there is not any contact between the rotor 7 and the magnetic core 5 during the operation of the motor, in a manner which will be explained below.

The frames 2 and 2', which conceal the mechanism that converts the movement, consist of hollow cylinders which are fixed conveniently at one end to each semi-chassis 1 and 1', e.g. mounting by means of screws.

Cylinder heads 9 and 9′ are attached to the other end of frames 2 and 2′ to support bearings 10 and 10′. Semi-shafts 11 and 11′ project from the motor through bearings 10 and 10′.

Inside each frame 2 and 2′ as described above, a movement-converting mechanism is mounted supported by an elastic coupling. The movement-converting mechanism consists of pairs of steel disks 12 and 12′, each of which disks has one flat surface and one surface that has a cylindrical projection which, in the case of the outer disk, will be the projecting semi-axles 11, 11′, and on the inner disk, is a conical bore 13 of dimensions suitable to receive by joining to it, the corresponding conical end of the shaft 4 of the rotor 7. Both pairs of disks, 12 and 12′, are joined together by means of the interposition of a third disk 14 between their flat surfaces, the third disk 14 being made of elastic material such as rubber or any other material with characteristics suitable for the purpose. The diameter of said intermediate disk 14 should be equal to or slightly smaller than that of the disks 12 and 12′, and its thickness may be larger or smaller than that of said disks, depending on the elastic properties of the material of which it is made. In any case, it should be adhered to the flat surfaces of the disks 12 and 12′ by means of a strong adhesive.

It will be noted (FIGS. 2 and 3) that the axis of symmetry of the semi-axles 11 and 11′ in the bearings 10 and 10′ is moved, in relation to the axis of symmetry of the rotor 7 and the shaft 4, to an extent that slightly exceeds that of the play that exists between the shaft 4 and the sleeves 3 and 3′. Said eccentric motion is caused by the positioning selected for the bearings 10 and 10′ within the cylinder heads 9 and 9′, and is made possible by the elastic deformation of the disk 14, when the introduction of the cylinder heads 9 and 9′ into their housings consisting of the frames 2 and 2′ is made by using force. It will be understood, therefore, that there is a constant point of contact between the periphery of each end of the shaft 4 and the inner surface of the sleeves 3 and 3′, due to the communication of said eccentricity, through each semi-axle 11 and 11′, the outer disks 12 and 12′, and the elastic disk 14, the inner disks 12 and 12′, and the connections 13, with each end of the shaft 4.

The assembly which has been so constructed will, as soon as the coil 6 of the motor is supplied with power by an alternating current, create an alternating magnetic flux with a frequency that is equal to that of the supplied power, viz. 50 to 60 Hz in the case of the standard network current, and its value will range from zero to a maximum, be it positive or negative, twice for each cycle of the supplied current. In consequence thereof, there will be created a force of linear attraction of the rotor 7 toward the core 5 of the stator, the value of which will be a function of the existing magnetic flux, varying from a value of zero to a maximum that corresponds to the moment when the magnetic flux reaches its maximum.

But, the rotor 7 is not capable of moving in a linear manner toward the stator 5 exactly as the force of attraction demands, inasmuch as the ends of its shaft 4 are supported within the sleeves 3 and 3′, so that only one single permanent point of contact exists between them, in such a way that the shaft 4 of the rotor, when it moves, will have to follow the curved path that is made possible for it by the sleeves 3 and 3′. In view of the fact that there is pressure and friction in the contact point of each end of the shaft 4 and sleeves 3 and 3′, said shaft will be caused to perform a rolling slippage or movement of translation and rotation, through the interior of said sleeves 3 and 3′. To that end, the sleeves 3 and 3′ have been provided with a slippage track of case-hardened steel.

During the aforementioned movement of the rotor 7 and of the shaft 4, due to the attraction of the core 5 of the stator, the rubber disks 14 are deformed and, for that reason, generate a force in opposition to the movement of the rotor 7, which is a function of its elastic constant. Once the magnetic flux has reached its maximum value, it begins to go down and, consequently, decreases the force of attraction applied to the rotor 7 by the core 5 of the stator, making the force applied by the elastic disks 14 to the rotor 7 (from each inner disk 12 and 12′ tied to each end of the shaft 4) greater than that of the force of magnetic attraction supplied by the stator, and thus driving the rotor 7 back to its original position, for repeating the cycle once more, indefinitely, as long as the stator is supplied with any current.

It will be understood that the angular or circular movement of the shaft 4 for each impulse of attraction of the rotor 7 is a function of the force of said attraction. As has been shown in FIG. 5, there are distinct possible paths which the rotor, or more appropriately its shaft 4, can follow inside each sleeve 3 and 3′. When the force of attraction as applied by the stator to the rotor is such that it forces the latter to go to the lowest point allowed by the sleeves 3 and 3′, a subsequent reduction of the attraction applied to the rotor 7 allows the recovery of the energy stored in the elastic disks 14, and the rotor will, due to inertia, cause its shaft 4 to rise, turning, through the inner surface of the sleeves 3 and 3′ that is diametrically opposed to the one used for its descent; in that way, it completes one turn of its rotating slippage. Said movement would correspond to path "a" as shown by dashed lines in FIG. 5 and followed by the center of the shaft 4. In FIG. 5, reference letter "b" designates the most unfavorable case of a path to be followed by the center of the shaft 4, viz. when the operation of the motor is interrupted; the most frequent case occurring in practice is one in which the shaft 4 returns to its original or resting position by the same path, but in the opposite direction from the one used by its descent at the moment of the stop. As mentioned above, the eccentricity caused by each projecting semi-shaft 11 and 11′ through the interlocking of the bearings 10 and 10′ in regard to the axis of symmetry of the rotor 7 and its shaft 4 is larger than the play defined by the difference of the diameters between the shaft 4 and the sleeves 3 and 3′, so that the periphery of the shaft 4 is forced to put pressure on or be in constant contact with the inner rolling surface of each sleeve 3 and 3′. But in addition, the eccentricity given to semi-shafts 11 and 11′ has been calculated, such that the point of forced contact between the shaft 4 and the inner surface of the sleeves 3 and 3′ will be located in the most favorable point for the starting of the motor, which is also the most favorable point for the return of the shaft 4 of the rotor 7 to that initial favorable position, when the motor stops. At the same time, said predetermined eccentricity is used to control the direction of the turning of the motor. As a matter of fact, when the circular path is given, which the shaft 4 will follow through the inside of the sleeves 3 and 3′, the eccentricity transmitted to the semi-shafts 11 and 11′ can be calculated, in order that the initial or resting position of the shaft 4 is localized in a point of the first or fourth quadrant of the circular path to be followed, which is also within the inner circle as defined by the sleeves 3 and 3′. Accordingly, when one causes the current to pass through the stator, so as to start the operation of the motor, a magnetic attraction of the rotor 7 will be caused and will make it descend and begin its cycle of operating impulses, while the direction of the rotation will depend on the first or fourth quadrant in which the resting point of the shaft 4 in the sleeves 3 and 3′ has been selected, since that variation of its eccentricity of assembly has been provided for in the fastening means of the cylinder heads 9 and 9′ when attaching them to the frames 2 and 2′, said eccentricity making it possible to change the direction of the rotation of the motor. In accordance with the above, the rotation caused by the projecting semi-shafts 11 and 11′ is due to the repeated and cyclical impulses of attraction between stator and rotor, and since said attraction is a function of the flux, and since that, in turn, is a function of the current that circulates through the winding of the coil, it is evident that the speed of the motor can be controlled easily by means of varying the excitation.

In the example shown, the inner surface or rolling track of the sleeves 3 and 3′ as well as the outer surface of the shaft 4 are smooth, but those surfaces can also be ridged, fluted, knurled, etc., or also included is a toothed configuration that would facilitate the rolling of the ends of the shaft 4 during its slipping through the inside of the sleeves 3 and 3′, even though those embodiments would be optimal only for motors of large dimensions.

In the same way, it is apparent that any other magnetic core of the stator that would be different from the one shown in the attached drawings, and that would bring about an attraction of the rotor 7 in the form described here, would be equally useful.

Likewise, any other configuration of the frames 2 and 2′ which protect the mechanisms for the conversion of movement, and which bring about a sufficient interlocking with the semi-chassis 1 and 1′, and which also would make possible the movement of the eccentricity so as to vary the direction of the rotation of the motor, would also be useful in the present invention.

The use of a disk made of rubber or any similar material as the member to absorb the elastic deformation and recovery has been suggested, even though the same function and effects could be achieved by the interposition, between the disks 12 and 12′, of small steel straps, vertically and radially fixed to the smooth surfaces of said disks.

Any other modifications whatsoever, that could be introduced in the impulse motor as described above, without changing the essential characteristics of the same, are understood to fall within the spirit and scope of the invention as defined by the following claims.

I claim:

1. A pulse motor comprising a stator consisting of a core of magnetic plates activated by a coil, an upper part of said motor containing a semi-cylindrical cavity in which a cylindrical rotor is suspended on each end by a shaft, said stator, said coil, and said rotor being located in a chassis split into two halves which can be joined such that the outside of each of said semi-chassis has the end of the shaft of the rotor projecting from said semi-chassis, said ends of said shaft terminating in a conical shape, said ends being supported in rolling sleeves engaged in said semi-chassis, the inner diameter of said rolling sleeves being larger than the diameter of the shaft of the rotor and each conical end of the shaft of the rotor being connected by elastic means for the conversion of movement consisting of first and second disks, each of said disks having a smooth face and a face with a centered cylindrical projection, said first disk located toward the interior of the motor having a conical bore adapted to receive the corresponding conical end of the shaft of the rotor, and said second disk located toward the outside of the motor and having a projecting semi-shaft of the motor, and a third disk being interposed between said disks consisting of an elastically deformable material, said third disk being adhered to the smooth sides of said first and second disks, said means for the conversion of movement being hidden in frames that may be solidly connected to each semi-chassis and adapted to receive, in the end opposite the one attached to the semichassis, cylinder heads including bearing means for said projecting semi-shafts of the motor, said bearing means presenting, in relation to said rotor of said motor and to said shaft, an eccentricity that is larger than the difference of diameters that exists between said shaft of said rotor and the inside of said rolling sleeves, in such a way that said shaft of said rotor is constantly forced into contact with the inner surface of said rolling sleeves.

2. The pulse motor of claim 1 wherein the eccentricity supplied by said rolling means that support said projecting semi-axles of said motor, has been calculated such that the contact caused between said shaft of said rotor and the inside of said rolling sleeves is located, during the resting position of said shaft, in one of the upper quadrants of an inner circle defined by said rolling sleeves.

* * * * *